US 11,192,434 B2

(12) United States Patent
Hummel

(10) Patent No.: US 11,192,434 B2
(45) Date of Patent: Dec. 7, 2021

(54) DRIVE DEVICE FOR A VEHICLE AXLE, IN PARTICULAR A REAR AXLE

(71) Applicant: AUDI AG, Ingolstadt (DE)

(72) Inventor: Steffen Hummel, Flacht (DE)

(73) Assignee: AUDI AG, Ingolstadt (DE)

( * ) Notice: Subject to any disclaimer, the term of this patent is extended or adjusted under 35 U.S.C. 154(b) by 447 days.

(21) Appl. No.: 16/337,438

(22) PCT Filed: Jul. 21, 2017

(86) PCT No.: PCT/EP2017/068537
§ 371 (c)(1),
(2) Date: Mar. 28, 2019

(87) PCT Pub. No.: WO2018/059783
PCT Pub. Date: Apr. 5, 2018

(65) Prior Publication Data
US 2019/0283574 A1    Sep. 19, 2019

(30) Foreign Application Priority Data

Sep. 28, 2016  (DE) .................. 10 2016 218 717.1

(51) Int. Cl.
*B60K 17/16* (2006.01)
*B60K 1/02* (2006.01)
(Continued)

(52) U.S. Cl.
CPC ............... *B60K 1/02* (2013.01); *B60K 17/02* (2013.01); *B60K 17/043* (2013.01);
(Continued)

(58) Field of Classification Search
CPC ...... B60K 1/02; B60K 17/043; B60K 17/046; B60K 17/02; B60K 17/08; B60K 17/165;
(Continued)

(56) References Cited

U.S. PATENT DOCUMENTS

2012/0058858 A1*  3/2012  Ichikawa ............... B60K 6/543
                                                    477/5
2014/0332301 A1   11/2014  Knoblauch et al.
2014/0371016 A1   12/2014  Knoblauch

FOREIGN PATENT DOCUMENTS

CN    103958240 A    7/2014
CN    105480069 A    4/2016
(Continued)

OTHER PUBLICATIONS

Chinese Office Action dated Jun. 25, 2021, in connection with corresponding CN Application No. 201780059753.1 (16 pp., including machine-generated English translation).

(Continued)

*Primary Examiner* — Justin Holmes
(74) *Attorney, Agent, or Firm* — Maier & Maier, PLLC

(57) ABSTRACT

A drive device for a vehicle axle, in particular a rear axle, of a two-track vehicle with an electric drive, wherein an electric machine is associated with every vehicle wheel of the vehicle axle, the electric machine shafts of which electric machine can be drivingly connected, by a first and a second shifting element, to a first and a second flange shaft of the vehicle wheels, and wherein in a first transmission gear, the first and the second shifting element are shifted and the electric machine shafts output directly to the flange shafts of the vehicle wheels via the first and the second shifting element. The vehicle axle has a transverse differential which, on the output side, outputs to the flange shafts of the vehicle wheels and, on the input side, can be drivingly connected to the electric machine shafts by means of a third and a fourth shifting element.

18 Claims, 7 Drawing Sheets

(51) Int. Cl.
*B60K 17/02* (2006.01)
*B60K 17/08* (2006.01)
*B60K 17/354* (2006.01)
*B60K 17/356* (2006.01)
*B60K 17/04* (2006.01)
*B60L 15/20* (2006.01)
*F16H 48/36* (2012.01)

(52) U.S. Cl.
CPC ............ *B60K 17/046* (2013.01); *B60K 17/08* (2013.01); *B60K 17/165* (2013.01); *B60K 17/354* (2013.01); *B60K 17/356* (2013.01); *B60L 15/2054* (2013.01); *B60L 2220/42* (2013.01); *B60L 2220/46* (2013.01); *B60Y 2200/90* (2013.01); *B60Y 2200/91* (2013.01); *B60Y 2400/424* (2013.01); *B60Y 2400/427* (2013.01); *B60Y 2400/73* (2013.01); *B60Y 2400/804* (2013.01); *F16H 2048/364* (2013.01)

(58) Field of Classification Search
CPC ................ B60K 17/354; B60K 17/356; B60K 2001/001; B60K 2007/0061; B60L 15/2054; B60L 2220/46; B60L 2220/42; B60Y 2400/73; B60Y 2200/90; B60Y 2400/424; B60Y 2400/427; B60Y 2200/91; B60Y 2400/804; F16H 2048/364; Y02T 10/72; Y02T 10/64
See application file for complete search history.

(56) References Cited

FOREIGN PATENT DOCUMENTS

| | | | |
|---|---|---|---|
| CN | 109017251 A * | 12/2018 | |
| DE | 102006057857 A1 | 6/2008 | |
| DE | 102010005789 A1 * | 7/2011 | ............... B60K 1/02 |
| DE | 102010005789 A1 | 7/2011 | |
| DE | 102011004410 A1 | 8/2012 | |
| DE | 102011086062 A1 | 5/2013 | |
| DE | 102011056929 A1 | 6/2013 | |
| DE | 102011088648 A1 | 6/2013 | |
| DE | 102015008153 A1 | 1/2016 | |
| WO | WO-2011082707 A1 * | 7/2011 | ............... F16H 3/54 |

OTHER PUBLICATIONS

International Preliminary Report on Patentability (Chapter I) dated Apr. 11, 2019 of corresponding International application No. PCT/EP2017/068537; 10 pages.
Examination Report dated May 19, 2017 of corresponding German application No. 10 2016 218 717.1; 16 pages.
International Search Report and Written Opinion dated Oct. 17, 2017 of corresponding application No. PCT/EP2017/068537; 28 pages.

* cited by examiner

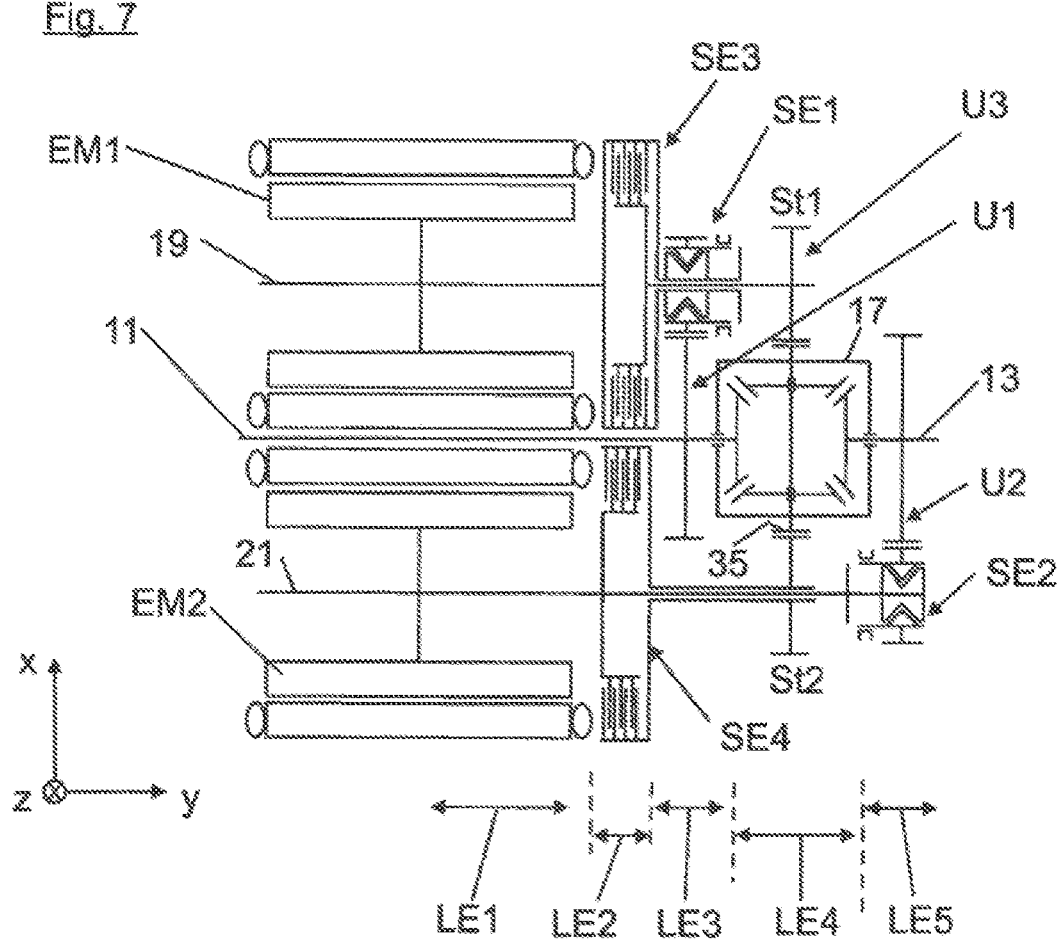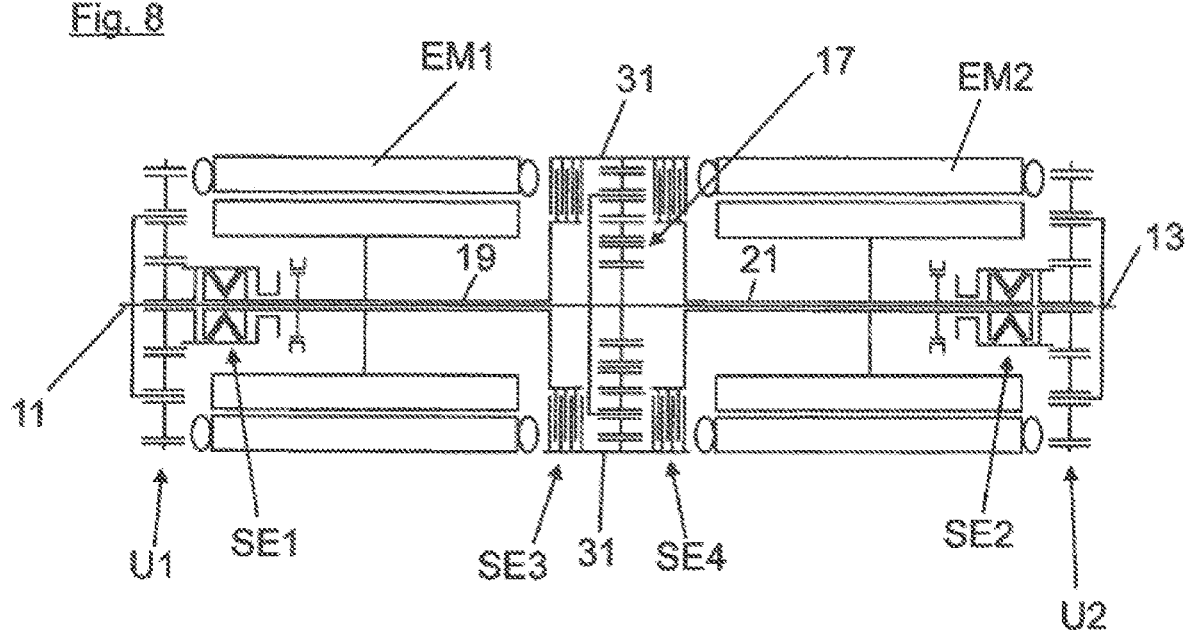

DRIVE DEVICE FOR A VEHICLE AXLE, IN PARTICULAR A REAR AXLE

FIELD

The disclosure relates to a drive device for a vehicle axle, in particular a rear axle, of a two-track vehicle having electric drive.

BACKGROUND

In a vehicle having electric drive, the electrically driven front axle can have an electric machine which is arranged, for example, axially-parallel to the flange shafts led to the vehicle wheels. In this case, the front axle can have a spur gear step, using which the electric machine shaft is connectable with respect to drive to an axle differential positioned between the two flange shafts. The axle differential in turn outputs to the two flange shafts leading to the vehicle wheels. In a rear axle, which is also electrically driven, two electric machines can be installed, which are each associated with one vehicle wheel of the rear axle. In a generic drive arrangement, the electric machine shafts thereof can be connectable with respect to drive via a first shifting element and a first transmission step (spur gear step) to the first flange shaft. In the same manner, the second electric machine can be connected via a second transmission step (spur gear step) and a second shifting element to the second flange shaft. In this case, each of the two electric machines drives one vehicle wheel in a wheel-selective manner, so that an axle differential, using which a torque distribution can be performed between the vehicle wheels, is not necessary.

In the rear axle outlined above, the two electric machines drive the vehicle wheels using equal drive torques during straight ahead travel. In specific driving situations, for example, during cornering, the driving behavior can be assisted by a torque redistribution (torque vectoring or differential lock function). Thus, for example, during cornering, at the curve entry, a drive torque can be displaced to the curve-exterior vehicle wheel (torque vectoring). Alternatively/additionally, during the cornering, at the curve exit, the drive torque can be displaced to the curve-interior vehicle wheel (differential lock function). This torque displacement is performed in the above-mentioned rear axle by appropriate control of the first and second electric machines.

A drivetrain of an electric vehicle having two electric machines is known from US 2014 0332301 A1. A rear axle of the vehicle has a differential and the two electric machines, which are coupled via a transmission and operate individually or jointly. An electrified drive arrangement for a hybrid vehicle is known from DE 10 2011 086 062 A1, in which two electric machines are arranged on the rear axle of the hybrid vehicle and are connected via a differential gear and coupling elements to a multistep transmission. A hybrid drive unit for a motor vehicle is known from DE 10 2011 004 410 A1, in which an electric machine is connected via a multistep planetary gear to a differential of a rear axle.

SUMMARY

The object of the invention is to provide a drive device for an electrically driven vehicle axle, in which a functional expansion is enabled using simple means, specifically with low installation space requirement and also with enhanced vehicle dynamics.

In the above-mentioned generic electrically driven rear axle, the first and the second electric machine are respectively connected via a first and a second shifting element with respect to drive to the first and the second flange shaft, each of which leads to one vehicle wheel. With closed first and second shifting elements, the drive torque generated in the two electric machines is output via the first and second shifting elements directly to the flange shafts of the vehicle wheels, in a wheel-selective manner without an additional axle differential interposed.

According to the characterizing part of patent claim 1, the above vehicle axle additionally has an axle differential, which outputs on the output side to the flange shafts of the vehicle wheels and is connectable on the input side with respect to drive via a third and fourth shifting element to the first and the second electric machine shafts. In an additional second transmission gear, the third and fourth shifting elements are closed. In this case, the first and the second electric machine shafts can output via the third and fourth shifting elements and the axle differential to the two flange shafts. When the second transmission gear is shifted, the first and the second shifting elements are open.

In this manner a wheel-selective drive takes place, in which a first torque flow from the first electric machine is transmitted via the first shifting element to the first flange shaft. Independently therefrom, a second torque flow from the second electric machine is transmitted via the second shifting element to the second flange shaft.

When the first transmission gear is shifted, the third and fourth shifting elements are open, while when the second transmission gear is shifted, the first and second shifting elements are open. In one technical implementation, the first to fourth shifting elements can be embodied as powershift. For example, the first and second shifting elements can be freewheel clutches, while the third and fourth shifting elements are embodied as multiplate clutches. The axle differential can be by way of example a bevel differential or a spur gear differential and/or a planetary differential. The axle differential is typically designed so that an equal drive torque distribution takes place on the first flange shaft and second flange shaft leading away therefrom.

In the above axle construction, a torque redistribution (i.e., torque vectoring or a differential lock function) can be implemented both in the first transmission gear and also in the second transmission gear as follows: Thus, when the first transmission gear is shifted (i.e., the first and second shifting elements are closed), the third or fourth shifting element can be at least temporarily closed. The drive torque generated by the first or second electric machine is thus allocated into a partial drive torque, which is transmitted via the first/second shifting element directly to the first/second flange shaft, and into a partial drive torque, which is transmitted via the third/fourth shifting element to the axle differential and is allocated from there uniformly onto the left and right vehicle wheels.

When the second transmission gear is shifted, in contrast, a differential drive takes place, in which the first and second shifting elements are open and a drive torque generated by the first and/or second electric machine is transmitted via the third and/or fourth shifting element to the axle differential.

When the second transmission gear is shifted (i.e., the third and fourth shifting elements are closed), the torque redistribution is implemented as follows: the first or second shifting element can thus be at least temporarily closed for the torque redistribution. The drive torque generated by the first or second electric machine is thus allocated into a partial drive torque which is transmitted via the first or second shifting element directly to the first or second flange shaft, and into a partial drive torque, which is transmitted via the third or fourth shifting element to the axle differential and is allocated there uniformly onto the left and right vehicle wheels.

The first and second electric machine shafts can preferably be connected via at least one first transmission step and one second transmission step (preferably spur gear steps) to the first and the second flange shafts. In one technical implementation, the first and the second electric machine shaft can respectively be coupled via the third and the fourth shifting element to at least one intermediate shaft, which outputs via a third transmission step to the input side of the axle differential.

Particularly compact embodiment variants of the drive device which also save installation space are explained hereafter: Thus, the first and second electric machine shafts can be positioned in an axially-parallel arrangement to the first and second flange shafts, which extend coaxially toward one another and define a wheel axle of the vehicle wheels. In the above axially-parallel arrangement, the first and second electric machines can be positioned in a mirror image with respect to a vehicle center longitudinal plane, wherein the electric machine shafts extend toward one another toward the vehicle interior in the vehicle transverse direction.

In the above axially-parallel arrangement, the first and the second transmission steps, i.e., preferably spur gear steps, can be arranged inside the two electric machines in the vehicle transverse direction. Moreover, an installation space, in which the third and the fourth shifting elements and the axle differential can be positioned in a manner favorable for installation space, can be provided viewed in the vehicle transverse direction between the two transmission steps. The electric machine shafts can moreover preferably be coupled via the third and fourth shifting elements to a common intermediate shaft, which extends coaxially to the electric machine shafts.

The first shifting element and the third shifting element are arranged coaxially to the first electric machine shaft and axially parallel to the flange shafts. In the same manner, the second shifting element and the fourth shifting element are arranged coaxially to the second electric machine shaft and axially parallel to the flange shafts.

In a second embodiment variant, the first and second electric machines can be arranged axially opposing in the vehicle longitudinal direction with respect to the flange shafts. In this case, the two electric machines can preferably be arranged positioned one behind another in alignment in the vehicle longitudinal direction and also essentially in one vehicle half with respect to the vehicle center longitudinal axis. With such an arrangement, the third transmission step can be allocated into two spur gear steps, which each output to the axle differential input side. Of the two spur gear steps, a first spur gear step can be coupled via the third shifting element to the first electric machine shaft. A second spur gear step can be coupled via the fourth shifting element to the second electric machine shaft.

Especially for an arrangement which is space-saving in the vehicle transverse direction, the two electric machines can be arranged in longitudinal alignment in a first longitudinal plane, the third and the fourth shifting elements can be arranged in longitudinal alignment in a second longitudinal plane, the first shifting element and the first transmission step can be arranged in longitudinal alignment in a third longitudinal plane, the third transmission step and the axle differential can be arranged in longitudinal alignment in a fourth longitudinal plane, and the second shifting element and the second transmission step can be arranged in longitudinal alignment in a fifth longitudinal plane.

In an alternative longitudinal arrangement of the two electric machines, each of the electric machine shafts can be allocated into an electric-machine-side shaft section which interacts with the rotor of the electric machine, and an output-side shaft section. The electric-machine-side shaft section and the output-side shaft section can be connected to one another via a gearing step, for example, via a bevel gear drive. With this longitudinal arrangement, the two electric machines can be aligned together with the electric-machine-side shaft section in longitudinal alignment with the vehicle longitudinal direction, while the output-side shaft sections can extend in relation to one another coaxially and in transverse alignment with the vehicle transverse direction. The output-side shaft section of the first electric machine shaft can be connected with respect to drive via the first shifting element and the first transmission step to the first flange shaft. Similarly, the output-side shaft section of the second electric machine shaft can be connected with respect to drive via the second shifting element and the second transmission step to the second flange shaft. Moreover, the two output-side shaft sections of the electric machine shafts can each be connected via the third shifting element and via the fourth shifting element to the input side of the axle differential.

Alternatively to the above arrangement, the electric machines can be positioned in a coaxial arrangement in relation to the first and second flange shafts. In such a coaxial arrangement, the third and the fourth shifting elements and also the axle differential can preferably be positioned between the two electric machines in the vehicle transverse direction. The electric machine shafts can be embodied in this case as hollow shafts, through which the flange shafts are guided toward the vehicle exterior. The first transmission step and the second transmission step, which connect the flange shafts to each of the electric machine shafts—with the first and the second shifting element interconnected—can respectively adjoin the vehicle-exterior ends of the two flange shafts.

The advantageous embodiments and refinements of the invention explained above and/or represented in the dependent claims can be used individually or also in any arbitrary combination with one another—except, for example, in cases of unambiguous dependencies or alternatives which cannot be unified.

BRIEF DESCRIPTION OF THE DRAWINGS

The disclosure and its advantageous embodiments and refinements and the advantages thereof will be explained in greater detail hereafter on the basis of drawings.

In the figures:

FIG. 7 shows view corresponding to FIG. 2 of drive devices according to a second exemplary embodiment;

FIG. 8 shows view corresponding to FIG. 2 of drive devices according to a third exemplary embodiment;

DETAILED DESCRIPTION

Figure 1:
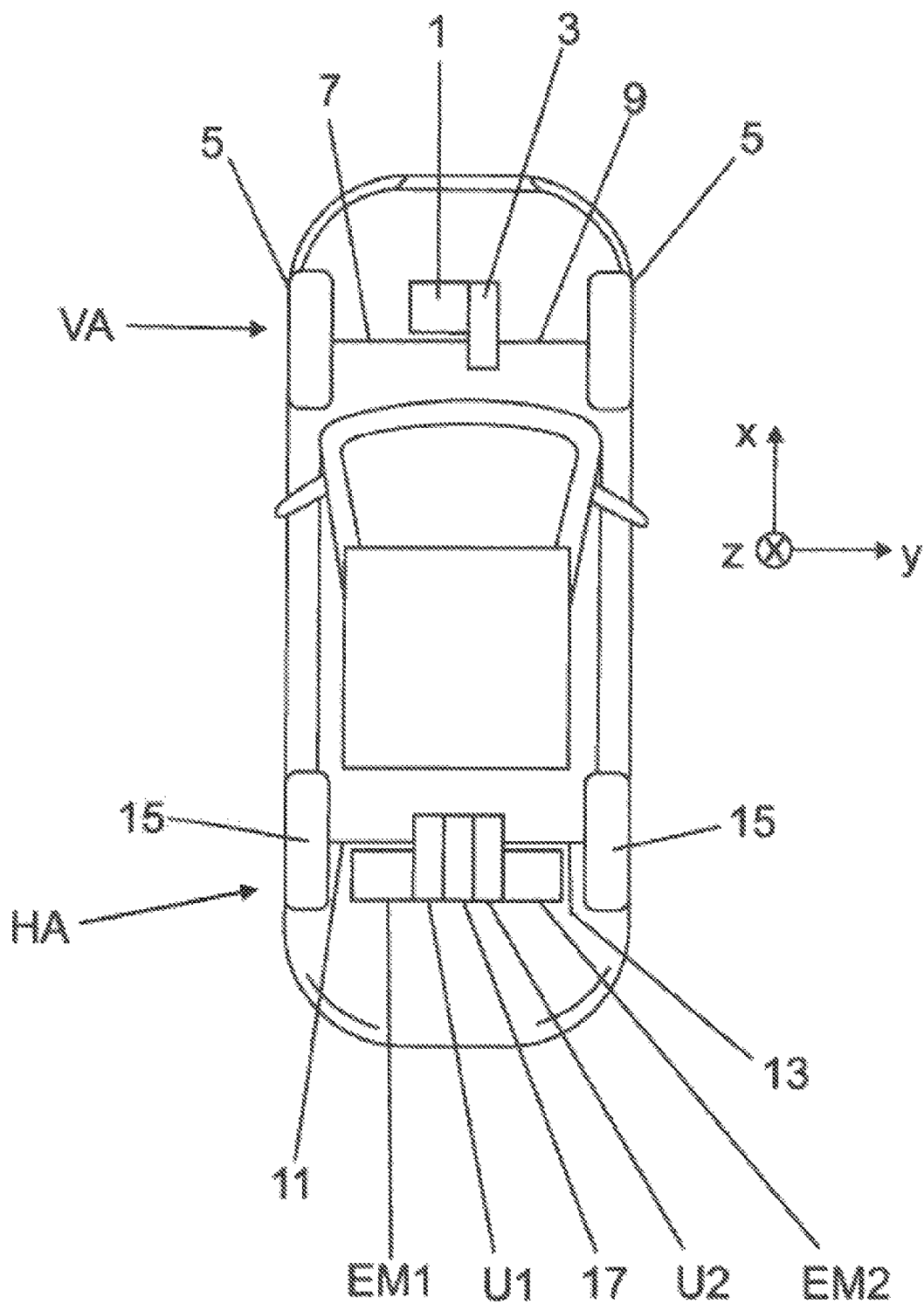
FIG. 1 shows the outline of an electrically operated motor vehicle from above having emphasized, schematically illustrated vehicle axles.
Figure 2:
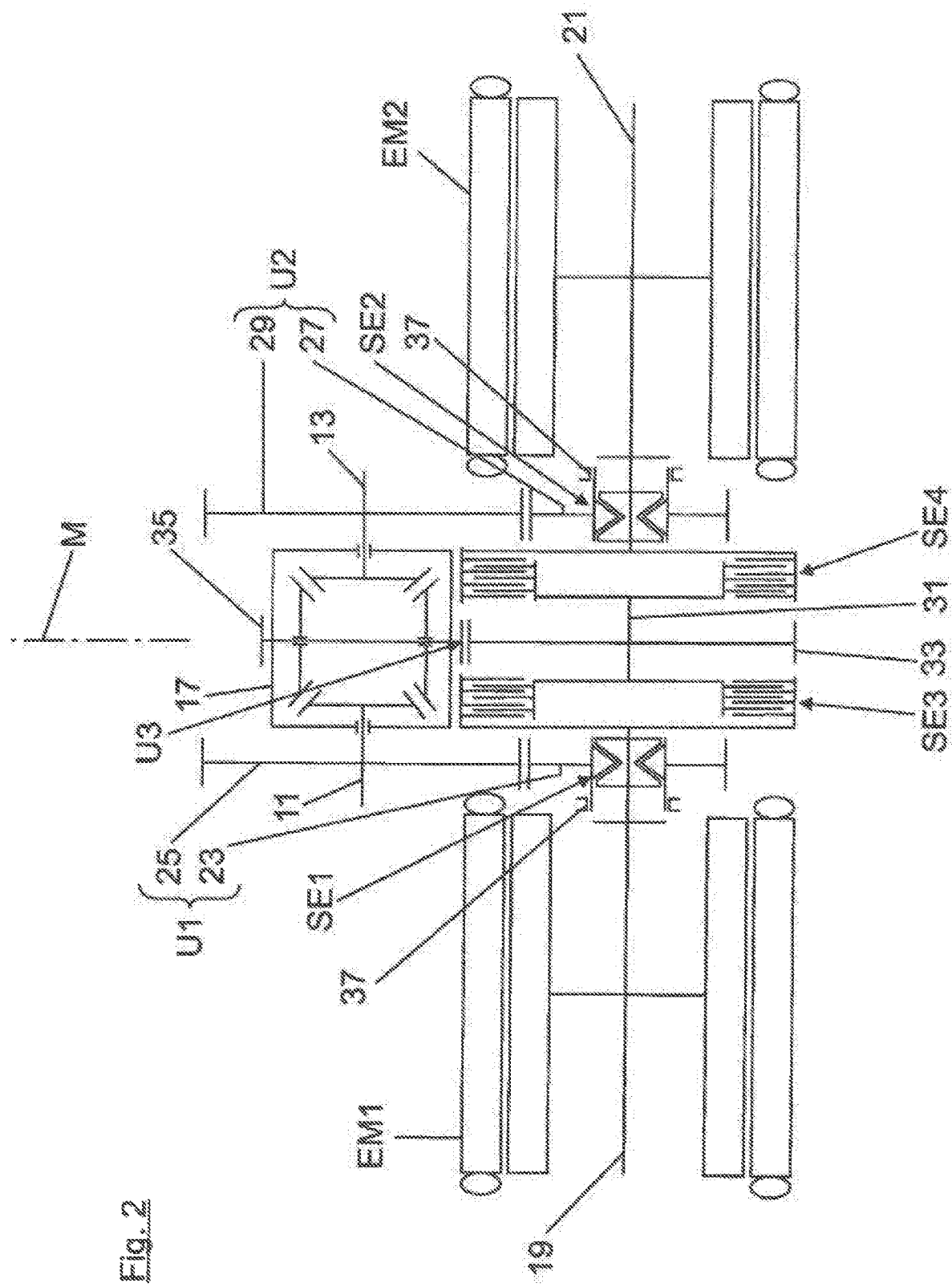
FIG. 2 shows a drive device for the rear axle of the vehicle according to a first exemplary embodiment.

An electrically driven motor vehicle is shown in FIG. 1, which has an electrically drivable front axle VA and an electrically drivable rear axle HA. The front axle VA is equipped with precisely one electric machine 1, which outputs, via a front axle differential 3, to the left and right flange shafts 7, 9 leading to the right and left front wheels 5. The rear axle HA has a drive device, in which, in contrast to the front axle VA, one electric machine EM1, EM2 is associated with each of the rear wheels 15. The two electric machines EM1, EM2 are arranged in FIG. 1 axially-parallel to the right and left flange shafts 11, 13, which are coaxially aligned in relation to one another and lead to the rear wheels 15 and define the wheel axles thereof. The first and the second electric machines EM1, EM2 are positioned behind the flange shafts 11, 13 in a mirror image with respect to a vehicle center longitudinal plane M. A first transmission step U1 and a second transmission step U2 and, approximately in the middle, an axle differential 17 are positioned between the two electric machines EM1, EM2. The axle differential 17 is designed in this case in common practice so that an equal drive torque distribution takes place on to the first and the second flange shafts 11, 13. The above drive components installed in the rear axle HA together form a drive device, the transmission structure of which is explained hereafter on the basis of FIG. 2:

Thus, in FIG. 2, the two electric machines EM1, EM2 each have electric machine shafts 19, 21, which extend toward one another in the vehicle transverse direction y. The electric machine shaft 19 of the first electric machine EM1 is connected via a freewheel clutch SE1 to a drive gear wheel 23, which, together with an output wheel 25 arranged in a rotationally-fixed manner on the first flange shaft 11, forms the first transmission step U1. In a similar manner, the electric machine shaft 21 of the second electric machine EM2 is also connected in a rotationally-fixed manner via a freewheel clutch SE2 to a drive gear wheel 27, which, together with an output gear wheel 29 arranged in a rotationally-fixed manner on the second flange shaft 13, forms the second transmission step U2 (i.e., spur gear step).

In FIG. 2, both the first and also the second electric machine shafts 19, 21 are also extended toward the vehicle interior beyond the respective freewheel clutch SE1, SE2 and are connected in a rotationally-fixed manner to a clutch housing (i.e., outer plate carrier) of a third and a fourth shifting element SE3, SE4, which are both implemented as powershift multiplate clutches. The two inner plate carriers of the shifting elements SE3 and SE4 are connected to one another via a common intermediate shaft 31, which is arranged coaxially to the two electric machine shafts 19, 21. The intermediate shaft 31 carries an intermediate gear wheel 33 in a rotationally-fixed manner, which, together with an input-side outer gear wheel 35 of the axle differential 17, forms a third transmission step U3. The axle differential 17 outputs on the output side to the two flange shafts 11, 13 (i.e., half-shafts of the rear wheels 15).

The drive device shown in FIG. 2 can be operated in a first and a second transmission gear I, II. When first transmission gear I is shifted (FIG. 3), so-called wheel-selective drive takes place, in which the two first shifting elements SE1, SE2 are shifted, i.e., the freewheel is bypassed by means of the shifting claw 37 (FIG. 2), and the electric machine shafts 19, 21 are connected in a rotationally-fixed manner to the drive gear wheels 23, 27 of the first and second transmission steps U1, U2. The third and fourth shifting elements SE3 and SE4 are open, in contrast. In this case, according to FIG. 3, a first torque flow $M_1$ can be transmitted from the first electric machine shaft 19 via the shifted first shifting element SE1 and the first transmission step U1 to the first flange shaft 11. Independently thereof, a second torque flow $M_2$ can be transmitted from the second electric machine shaft 21 via the shifted second shifting element SE2 and the second transmission step U2 to the second flange shaft 13.

Figure 3:
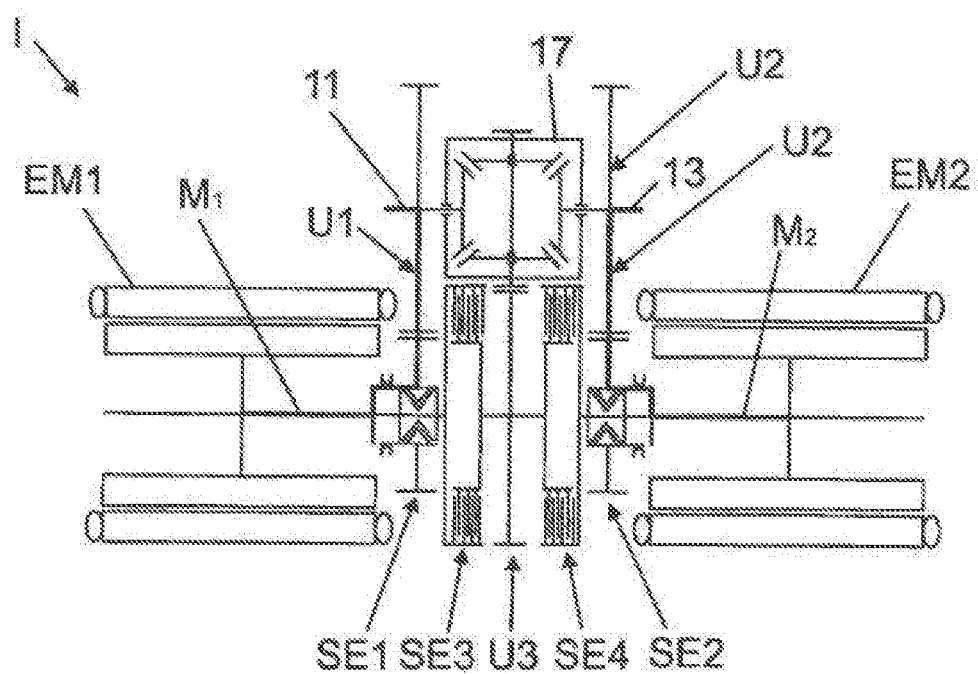
FIG. 3 shows a view corresponding to FIG. 2 having emphasized drive torque flow with shifted first transmission gear.
Figure 4:
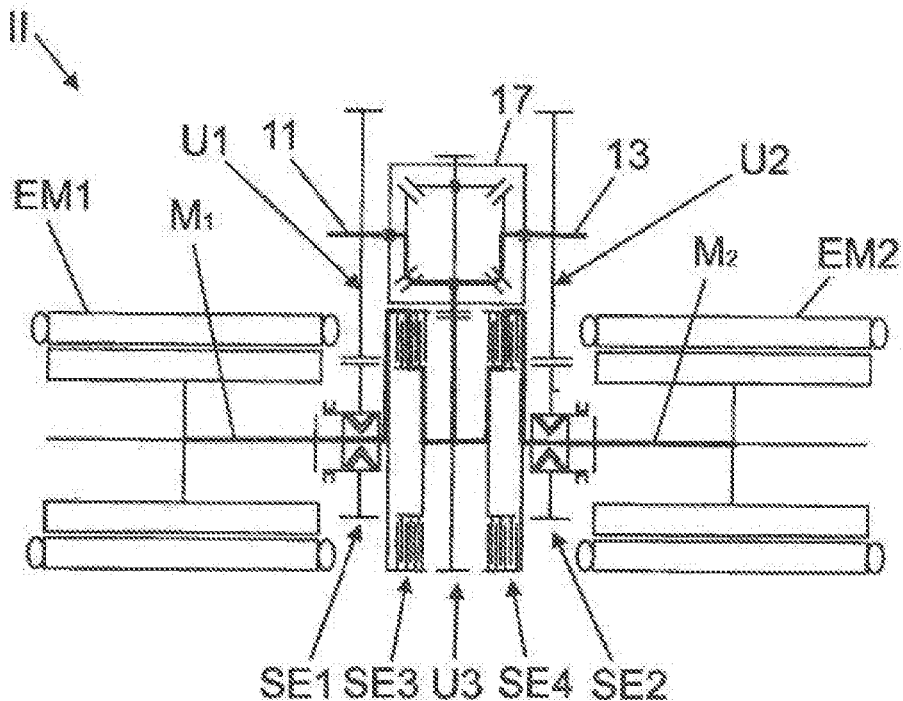
FIG. 4 shows a view corresponding to FIG. 2 having emphasized drive torque flow with shifted second transmission gear.

In FIG. 4, in contrast to FIG. 3, the second transmission gear II is shifted. In this case, there is no wheel-selective drive, but rather a so-called differential drive, in which the first and the second shifting elements SE1, SE2 are open and instead of this the third and fourth shifting elements SE3, SE4 are closed. Thus, according to FIG. 4, a drive torque flow $M_1$, $M_2$ takes place from the first and second electric machine shafts 19, 21 via the shifted third and fourth shifting elements SE3 and SE4 and also via the third transmission step U3 into the axle differential 17, from which it is allocated uniformly onto the left and right flange shafts 11, 13.

In FIG. 4, when second transmission gear II is shifted, the two electric machines EM1, EM2 are in operation. Instead of this, the second transmission gear II can also be operated using only one of the two electric machines EM1, EM2, since an equal drive torque distribution onto the first and second flange shafts 11, 13 always takes place via the axle differential 17.

Figure 5:
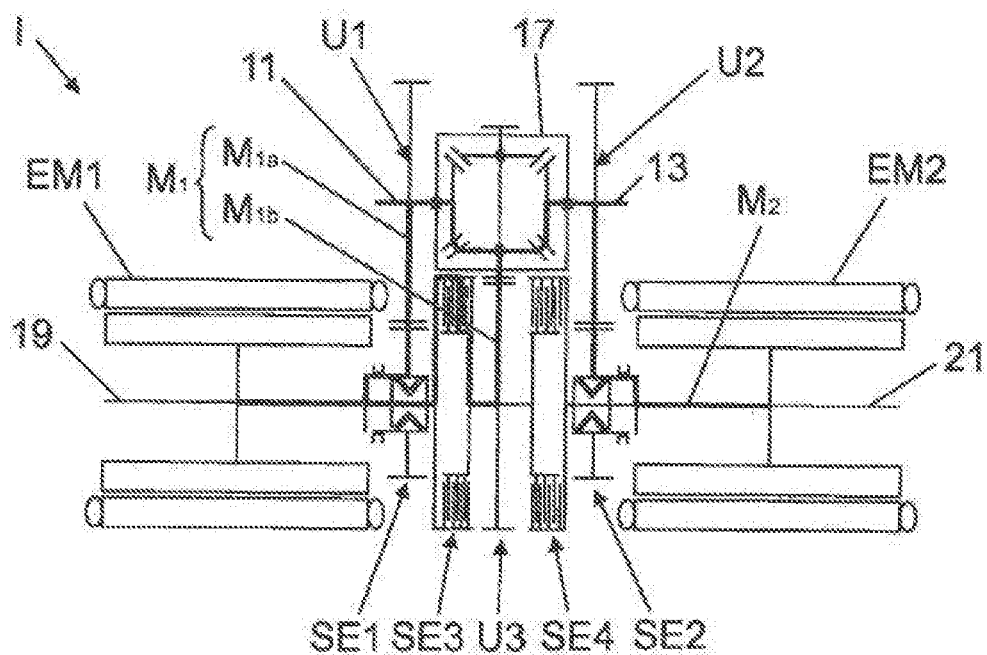
FIG. 5 shows a view corresponding to FIG. 3 with an additional torque displacement to the flange shaft leading to the right vehicle wheel.

To explain the functionality of the drive device, a driving situation, for example, cornering, is shown in FIG. 5, in which a torque difference is to be achieved between the two flange shafts 11, 13. In FIG. 5, the drive device is operated with shifted first transmission gear I. To achieve a torque redistribution in the direction toward the right rear wheel 15 (i.e., in the direction toward the second flange shaft 13), the third shifting element SE3 is additionally closed in FIG. 5. The drive torque $M_1$ generated by the first electric machine EM1 is thus allocated into a first partial drive torque $M_{1a}$ and a second partial drive torque $M_{1b}$. The first drive torque $M_{1a}$ is transmitted directly via the first shifting element SE1 to the first flange shaft 11. The second drive torque $M_{1b}$, in contrast, is transmitted via the closed third shifting element SE3 to the axle differential 17 and is allocated there uniformly onto the left and right flange shafts 11, 13.

For example, with a drive torque $M_{EM1}$ and $M_{EM2}$ of 500 Nm generated by the first and second electric machines EM1, EM2 and a transmission ratio ii of the first and second transmission steps U1 and U2 of 10 and a transmission ratio $i_3$ of the third transmission step U3 of 5, the following constellation results: In this case, via the first transmission step U1, a partial drive torque $M_{1a}$ of, for example, 200 Nm is transmitted via the first transmission step U1 to the first flange shaft 11. Moreover, a second drive torque $M_{1b}$ of 300 Nm, for example, was transmitted to the third transmission step U3.

The second electric machine EM2 still transmits its drive torque $M_{EM2}$ of 500 $N_m$ via the second shifting element SE2 to the second flange shaft 13. A torque of 1500 Nm is therefore applied on the input side to the axle differential 17, which is distributed uniformly to the two flange shafts 13, 11. A drive torque of 2750 Nm is thus introduced into the first flange shaft 11, while a drive torque of 5750 Nm is introduced into the second flange shaft 13. Therefore, a torque difference of 3000 Nm results between the two flange shafts 11, 13, while the total drive torque is 8500 Nm.

Figure 6:
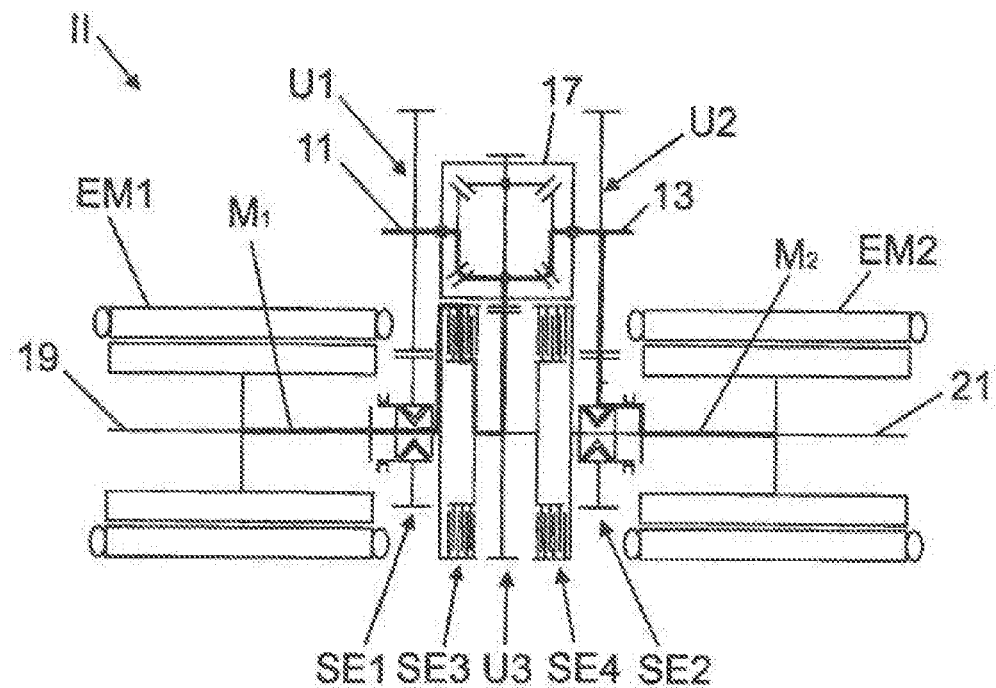
FIG. 6 shows a view corresponding to FIG. 2 having a torque displacement to the flange shaft leading to the right vehicle wheel.

A further driving situation is shown in FIG. 6, in which the drive device is operated with second transmission gear II shifted and, for example, cornering takes place, during which a torque difference is also to be achieved between the two flange shafts 11, 13. In this case, the torque redistribution takes place in that the third shifting element SE3 and the second shifting element SE2 are shifted, while the first shifting element SE1 and the fourth shifting element SE4 remain open. With a drive torque $M_{EM1}$ of 300 Nm generated by the first electric machine EM1 and with a drive torque $M_{EM2}$ generated by the second electric machine EM2 of 100 Nm, the following situation results: The first electric machine EM1 thus transmits, via the shifted third shifting element SE3, the entire drive torque $M_{EM1}$ on the third transmission step U3, so that 1500 Nm are applied at the input on the axle differential. This is transmitted uniformly allocated in each case to the first and the second flange shafts 11, 13. In addition, the drive torque of 100 Nm generated by the second electric machine EM2 is transmitted via the shifted second shifting element SE1 and via the second transmission step U2 to the second flange shaft 13, so that the applied drive torque adds up to 1750 Nm in the second flange shaft 13, while only 750 $N_m$ are applied to the first flange shaft 11. A torque difference of 1000 Nm thus results between the two flange shafts 11, 13.

The drive device is shown according to a second embodiment variant in FIG. 7, in which the first and second electric machines EM1, EM2 are arranged axially opposing in the vehicle longitudinal direction x with respect to the flange shafts 11, 13. The two electric machines EM1, EM2 are arranged aligned in a longitudinal plane in the vehicle longitudinal direction x. In contrast to the preceding exemplary embodiment, the third transmission step U3 has two spur gear steps St1, St2, which each drive the input-side outer gear wheel 35 of the axle differential 17. The upper first spur gear step St1 in FIG. 7 can be coupled via the third shifting element SE3 to the first electric machine shaft 19. The second spur gear step St2 can be coupled via the fourth shifting element SE4 to the second electric machine shaft 21.

As mentioned above, the two electric machines EM1, EM2 are arranged in a first longitudinal plane LE1. The third and fourth shifting elements SE3 and SE4 are arranged aligned in succession in a second longitudinal plane LE2, while the first transmission step U1 is arranged together with the first shifting element SE1 in a third longitudinal plane LE3. The third transmission step U3 is arranged together with the axle differential 17 in a fourth longitudinal plane LE4, while the second shifting element SE2 is arranged together with the second transmission step U2 in a fifth longitudinal plane LE5.

In FIG. 8, the electric machines EM1 and EM2 are positioned in coaxial arrangement in relation to the first and second flange shafts 11, 13. In the coaxial arrangement shown in FIG. 8, the third and fourth shifting elements SE3, SE4 and the axle differential 17, which is embodied here as a spur gear differential in a manner favorable for installation space, are arranged between the two electric machines EM1, EM2. The third and fourth shifting elements SE3, SE4 are each embodied as a multiplate clutch, of each of which the two outer plate carriers are connected to one another via a common intermediate shaft 31. The intermediate shaft 31, which is embodied as a ring gear, is coupled to the axle differential 17 implemented as a spur gear differential. In FIG. 8, the electric machine shafts 19, 21 are implemented as hollow shafts, through which the two flange shafts 11, 13 are guided to the vehicle exterior. The two flange shafts 11, 13 are each connected in the vehicle transverse direction y outside the two electric machines EM1, EM2 via the first transmission step U1 and via the second transmission step U2 to the first shifting element SE1 and the second shifting element SE2 interconnected to the first and second electric machine shafts 19, 21, respectively.

Figure 9:
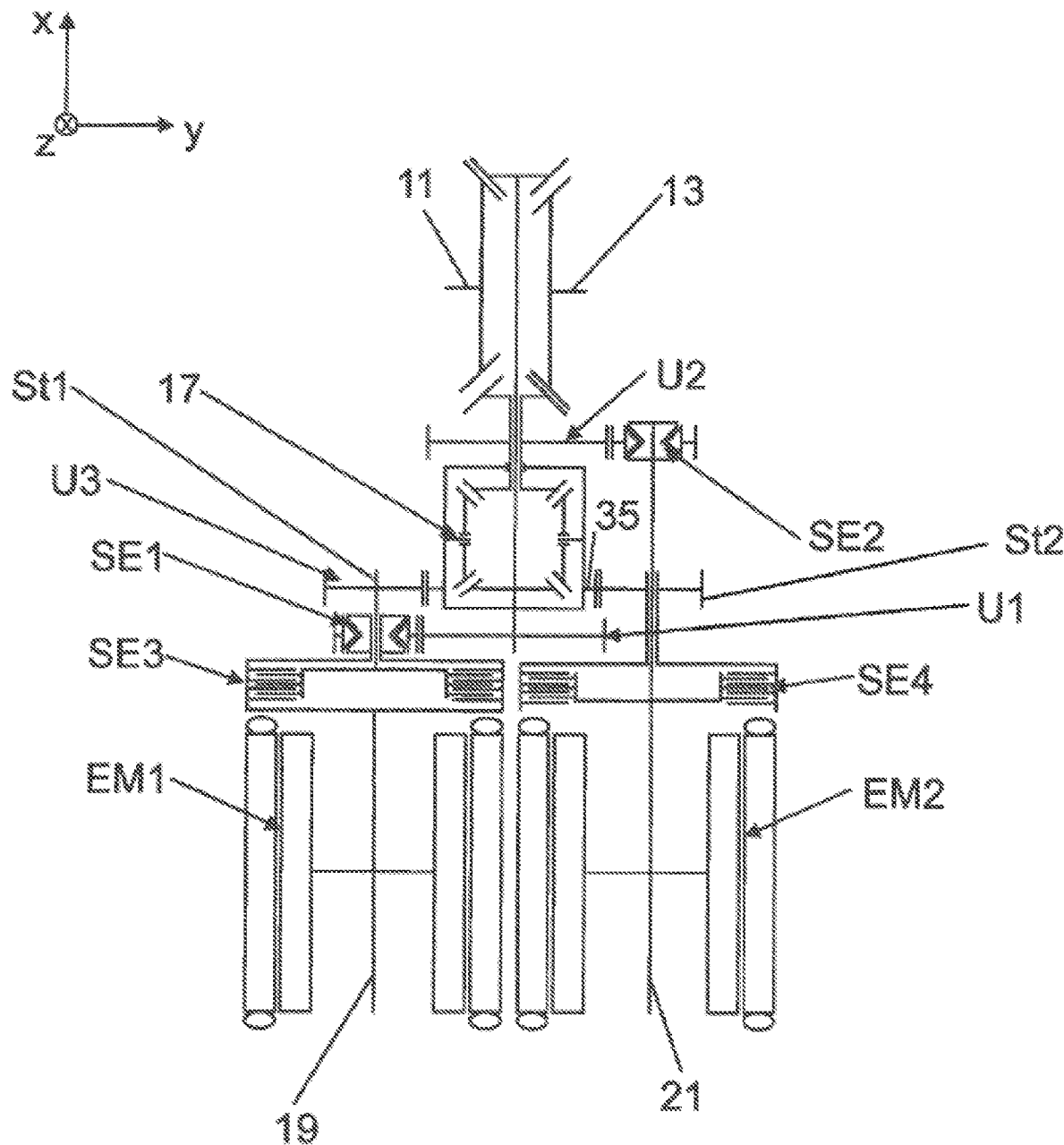
FIG. 9 shows view corresponding to FIG. 2 of drive devices according to a fourth exemplary embodiment.

In FIG. 9, the two electric machines EM1, EM2 are positioned in a longitudinal arrangement in which the electric machines EM1, EM2 are positioned axially-parallel to one another and perpendicular to the two flange shafts 11, 13. The third transmission step U3 has (similarly to FIG. 7), two spur gear steps St1, St2 outputting to the axle differential input side 35, of which the first spur gear step St1 (arranged on the left side in FIG. 9) can be coupled via the third shifting element SE3 to the first electric machine shaft 19. The second spur gear step St2 can be coupled via the fourth shifting element SE4 to the second electric machine shaft 21.

As can furthermore be seen from FIG. 9, the first electric machine shaft 19, the third shifting element SE3, and the first shifting element SE1 are arranged coaxially in the vehicle longitudinal direction x. In the same manner, the second electric machine shaft 21, the fourth shifting element SE4, and the second shifting element SE2 are arranged coaxially in the vehicle longitudinal direction x. In this case, the first transmission step U1 and the second transmission step U2 are spaced apart from one another in the vehicle longitudinal direction x via an installation space, in which the third transmission step U3 is arranged together with the axle differential 17.

Figure 10:
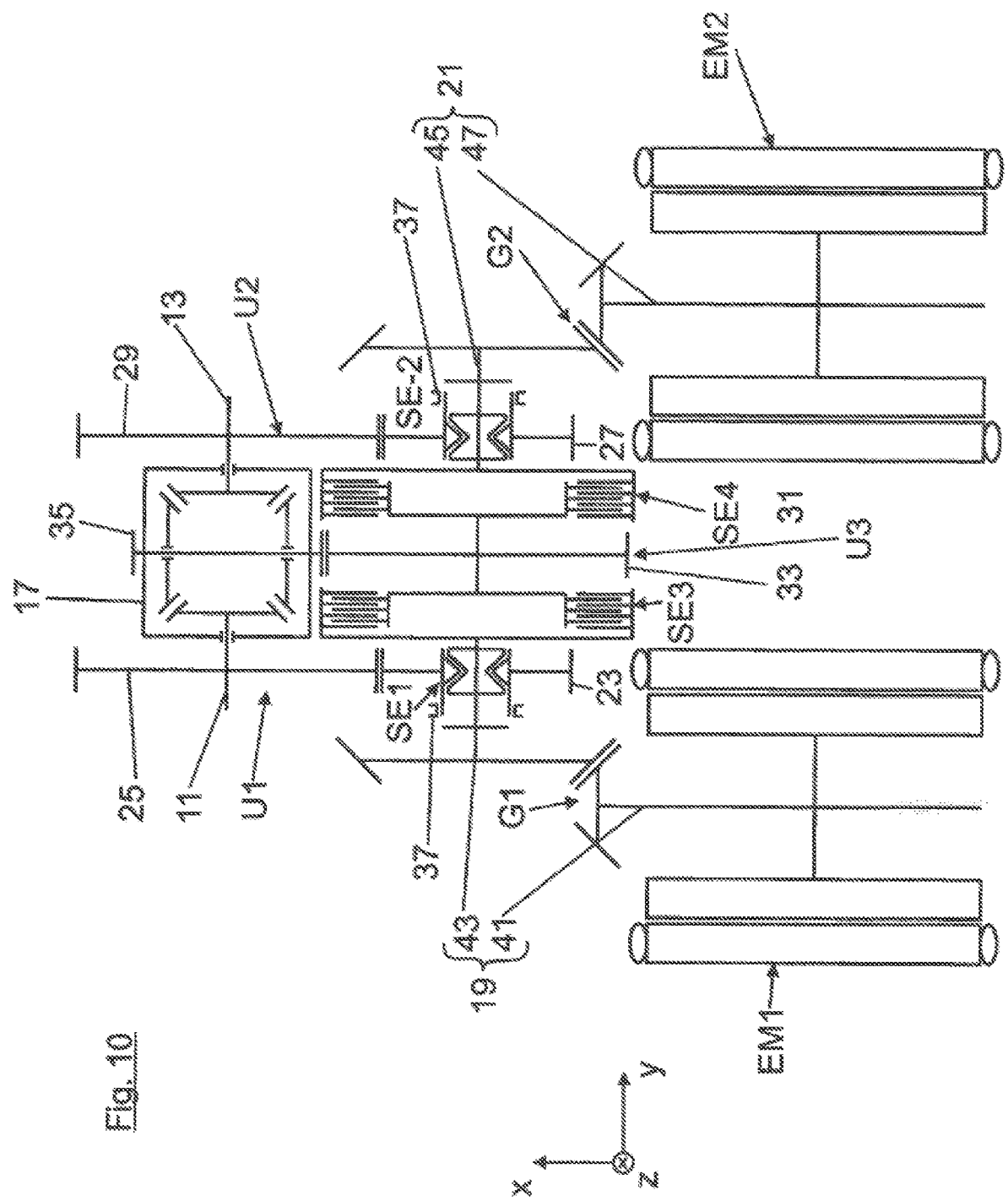
FIG. 10 shows view corresponding to FIG. 2 of drive devices according to a fifth exemplary embodiment.

The drive device shown in FIG. 10 is constructed with a substantially structurally-equivalent configuration as the drive device shown in FIG. 2. Therefore, reference is made to the functionally-equivalent and/or structurally-equivalent components which have already been explained on the basis of FIG. 2. In contrast to FIG. 2, in FIG. 10, the first and second electric machines EM1, EM2 are not arranged coaxially to one another in transverse alignment in the vehicle transverse direction y. Rather, in FIG. 10, the two electric machines EM1, EM2—as also in FIG. 9—are positioned in a longitudinal arrangement in which the two electric machines EM1, EM2 are aligned axially parallel to one another in the vehicle longitudinal direction x and also are positioned perpendicularly to the two flange shafts 11, 13.

In FIG. 10, the first electric machine shaft 19 is allocated into an electric-machine-side shaft section 41 and an output-side shaft section 43, which are connected to one another with respect to drive via a first gearing step G1. The first gearing step G1 is implemented as a bevel gear drive. According to FIG. 10, the electric-machine-side shaft section 41 interacts with the rotor of the first electric machine EM1, while the output-side shaft section 43 is connected via the first freewheel clutch SE1 to the output gear wheel 23, which, together with the output gear wheel 25 arranged in a rotationally-fixed manner on the flange shaft 11, forms the first transmission step U1. The output-side shaft section 43 of the first electric machine shaft 19 is additionally extended toward the vehicle interior beyond the first freewheel clutch SE1 and is attached in a rotationally-fixed manner on the clutch housing (i.e., on the outer plate carrier) of the third shifting element SE3.

In the same manner, the second electric machine shaft 21 is also allocated into an electric-machine-side shaft section 47 and an output-side shaft section 45, which are connected to one another via a second gearing step G2, which is also implemented as a bevel gear drive. The output-side shaft section 45 of the second electric machine shaft 21 is connected via the second freewheel clutch SE2 to the output gear wheel 27, which, together with the output gear wheel 29 arranged in a rotationally-fixed manner on the second flange shaft 13, forms the second transmission step U2. Moreover, the output-side shaft section 45 of the second electric machine shaft 21 is also displaced toward the vehicle interior beyond the second freewheel clutch SE2 and is attached in a rotationally-fixed manner to the clutch housing of the fourth shifting element SE4.

The invention claimed is:

1. A drive device comprising:
a vehicle axle, in particular a rear axle, of a two-track vehicle having electric drive, wherein an electric machine is associated with each vehicle wheel of the vehicle axle, the electric machine shafts of which are connectable via respectively a first and a second shifting element with respect to drive to a first and a second flange shaft of the vehicle wheels, and wherein in a first transmission gear, the first and second shifting elements are shifted and the electric machine shafts output via the first and second shifting elements directly to the flange shafts of the vehicle wheels, wherein the vehicle axle has an axle differential, which outputs on the output side to the flange shafts of the vehicle wheels and is connectable on the input side with respect to drive via a third and fourth shifting element to the electric machine shafts, wherein in a second transmission gear, the third and/or fourth shifting elements are closed and the first and/or second electric machine shafts output via the third and fourth shifting element and the axle differential to the flange shaft, wherein the first and the second electric machine shafts are each connected via a first and a second transmission step, in particular spur gear steps, to the first and second flange shafts, wherein the first and the second electric machine shafts can be coupled via the third and fourth shifting elements to at least one intermediate shaft, which outputs via a third transmission step, in particular a spur gear step, to the input side of the axle differential.

2. The drive device as claimed in claim 1, wherein, when the first transmission gear is shifted, a wheel-selective drive takes place, in which a first torque flow from the first electric machine is transmitted via the first shifting element to the first flange shaft and independently therefrom, i.e., decoupled with respect to drive, a second torque flow from the second electric machine is transmitted via the second shifting element to the second flange shaft.

3. The drive device as claimed in claim 1, wherein, when the first transmission gear is shifted, the third and fourth shifting elements are open.

4. The drive device as claimed in claim 1, wherein the axle differential is designed in such a way that an equal drive torque distribution onto the first and second flange shafts takes place, and/or in that particularly for a redistribution taking place with shifted first transmission gear of the drive torques acting on the left and right vehicle wheels, the third or fourth shifting element is closed, whereby the drive torque generated by the first or second electric machine is allocated into a partial drive torque, which is transmitted via the first or second shifting element directly to the first or second flange shaft, and into a partial drive torque, which is transmitted via the third or fourth shifting element to the axle differential and is allocated there uniformly onto the left and right vehicle wheels.

5. The drive device as claimed in claim 1, wherein, when the second transmission gear is shifted, a differential drive takes place, in which the first and second shifting elements are open, and a drive torque generated by the first and/or second electric machine is transmitted via the third and/or fourth shifting element to the axle differential.

6. The drive device as claimed in claim 5, wherein, for a redistribution taking place when the second transmission gear is shifted of the drive torques acting on the left and right vehicle wheels, the first or second shifting element is closed, whereby the drive torque generated by the first or second electric machine, is allocated into a partial torque which is transmitted via the first or second shifting element directly to the first or second flange shaft, and into a partial torque, which is transmitted via the third or fourth shifting element to the axle differential and is allocated there uniformly onto the left and right vehicle wheels.

7. The drive device according to claim 1, wherein the first and second electric machine shafts are positioned in an axially-parallel arrangement to the first and second flange shafts, in which the first and second electric machines are positioned in a mirror image with respect to a vehicle center longitudinal plane, and the electric machine shafts extend toward one another in the vehicle transverse direction.

8. The drive device according to claim 7, wherein the first and the second transmission steps are arranged inside the two electric machines in the vehicle transverse direction, and in that an installation space for the third and fourth shifting elements and for the axle differential is provided in the vehicle transverse direction between the two transmission steps.

9. The drive device according to claim 8, wherein the electric machine shafts can be coupled via the third and fourth shifting elements to precisely one common intermediate shaft.

10. The drive device according to claim 1, wherein the first and second electric machines are arranged axially opposing in the vehicle longitudinal direction with respect to the flange shafts, and in particular the two electric machines are arranged in alignment in the vehicle longitudinal direction.

11. The drive device according to claim 10, wherein the third transmission step has two spur gear steps outputting to the axle differential input side, of which a first spur gear step can be coupled via the third shifting element to the first electric machine shaft, and a second spur gear step can be coupled via the fourth shifting element to the second electric machine shaft.

12. The drive device according to claim 10, wherein the two electric machines are arranged in a first longitudinal plane, the third and fourth shifting elements are arranged in a second longitudinal plane, the first shifting element and the first transmission step are arranged in a third longitudinal plane, the third transmission step and the axle differential are arranged in a fourth longitudinal plane, and the second shifting element and the second transmission step are arranged in a fifth longitudinal plane.

13. The drive device according to claim 1, wherein the electric machines and the first and second flange shafts are positioned in a coaxial arrangement, in which coaxial arrangement the third and fourth shifting elements and the axle differential are arranged between the electric machines in the vehicle transverse direction, and in that the electric machine shafts are embodied as hollow shafts, through which the flange shafts are guided toward the vehicle exterior.

14. The drive device according to claim 13, wherein the first and the second transmission steps are each arranged outside the electric machines in the vehicle transverse direction.

15. The drive device according to claim 1, wherein the two electric machines are positioned in a longitudinal arrangement, in which longitudinal arrangement the electric machines are positioned with the electric machine shafts thereof axially-parallel to one another and perpendicular to the flange shafts.

16. The drive device according to claim 15, wherein the third transmission step has two spur gear steps outputting to the axle differential input side, of which a first spur gear step can be coupled via the third shifting element to the first electric machine shaft, and a second spur gear step can be coupled via the fourth shifting element to the second electric machine shaft.

17. The drive device according to claim 16, wherein the first electric machine shaft, the third shifting element, and the first shifting element are arranged coaxially in the vehicle longitudinal direction, and in that the second electric machine shaft, the fourth shifting element and the second shifting element are arranged coaxially in the vehicle longitudinal direction.

18. The drive device according to claim 16, wherein an installation space, in which the third transmission step is arranged together with the axle differential, is provided between the first transmission step and the second transmission step in the vehicle longitudinal direction.

* * * * *